US012772982B2

(12) United States Patent
Minkwitz et al.

(10) Patent No.: US 12,772,982 B2
(45) Date of Patent: Oct. 27, 2026

(54) TUBULAR CASING (S) FOR FOOD, CONTAINING AT LEAST ONE COPOLYAMIDE COMPOSED OF AT LEAST ONE LACTAM, A DICARBOXYLIC ACID AND 1,5-DIAMINO-3-OXAPENTANE

(71) Applicant: BASF SE, Ludwigshafen am Rhein (DE)

(72) Inventors: Rolf Minkwitz, Ludwigshafen am Rhein (DE); Florian Richter, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 312 days.

(21) Appl. No.: 18/691,939

(22) PCT Filed: Sep. 6, 2022

(86) PCT No.: PCT/EP2022/074686
§ 371 (c)(1),
(2) Date: Mar. 14, 2024

(87) PCT Pub. No.: WO2023/041369
PCT Pub. Date: Mar. 23, 2023

(65) Prior Publication Data
US 2024/0389606 A1 Nov. 28, 2024

(30) Foreign Application Priority Data
Sep. 17, 2021 (EP) .................................... 21197333

(51) Int. Cl.
*A22C 13/00* (2006.01)
*B29C 48/00* (2019.01)
(Continued)

(52) U.S. Cl.
CPC ...... *A22C 13/0013* (2013.01); *B29C 48/0018* (2019.02); *C08G 69/26* (2013.01);
(Continued)

(58) Field of Classification Search
CPC ........... B29C 48/0018; B29L 2031/712; C08G 69/14; C08G 69/26; C08J 2377/02;
(Continued)

(56) References Cited

U.S. PATENT DOCUMENTS 5,013,518 A 5/1991 Nielinger et al.
5,480,690 A 1/1996 Stenger et al.
(Continued)

FOREIGN PATENT DOCUMENTS

EP 0352562 A2 1/1990
JP 02-073858 A 3/1990
(Continued)

OTHER PUBLICATIONS

NPL Doc. #2, Iwabuchi et al., "Preparation of Regularly Sequenced Polyamides with Definite Numbers of Oxyethylene Units and Their Application as Phase Transfer Catalysts", IDS filed Apr. 7, 2024 (Year: 1983).*
(Continued)

*Primary Examiner* — Michael C. Romanowski
(74) *Attorney, Agent, or Firm* — Faegre Drinker Biddle & Reath LLP

(57) ABSTRACT

The present invention relates to a tubular casing (S) for food produced by polymerizing a lactam (A) and a monomer mixture (M), where the monomer mixture (M) comprises 1,5-diamino-3-oxapentane. The present invention further relates to the use of the tubular casing as a packaging casing, particularly a sausage casing.

18 Claims, 2 Drawing Sheets

(51) Int. Cl.
*B29K 77/00* (2006.01)
*C08G 69/26* (2006.01)
*C08G 69/40* (2006.01)

(52) U.S. Cl.
CPC ........ *C08G 69/40* (2013.01); *A22C 2013/002* (2013.01); *A22C 2013/0063* (2013.01); *B29K 2077/00* (2013.01); *C08J 2377/02* (2013.01); *C08J 2377/06* (2013.01)

(58) Field of Classification Search
CPC ......... C08J 2377/06; C08J 5/18; C08L 77/02; C08L 77/06
USPC ............................... 206/802; 428/34.1–36.92
See application file for complete search history.

(56) References Cited

U.S. PATENT DOCUMENTS

| | | | |
|---|---|---|---|
| 2018/0194896 A1 | 7/2018 | Habraken et al. | |
| 2019/0224902 A1* | 7/2019 | Goetz | B29C 48/022 |
| 2021/0017333 A1 | 1/2021 | Ray et al. | |

FOREIGN PATENT DOCUMENTS

| | | | |
|---|---|---|---|
| JP | 04-211321 | A | 8/1992 |
| JP | 2013-514446 | A | 4/2013 |
| JP | 2018-520242 | A | 7/2018 |
| JP | 2018-529834 | A | 10/2018 |
| WO | 2011/084448 | A1 | 7/2011 |
| WO | 2017/005812 | A1 | 1/2017 |
| WO | 2018/050486 | A1 | 3/2018 |
| WO | 2018/050487 | A1 | 3/2018 |
| WO | 2018/050488 | A1 | 3/2018 |

OTHER PUBLICATIONS

NPL Doc. #6, Savic, "Advances in the manufacture of sausage casings", IDS filed Apr. 22, 2024 (Year: 2012).*
European Search Report for EP Patent Application No. 21197333.4, Issued on Mar. 29, 2022, 3 pages.
International Preliminary Report on Patentability received for PCT Patent Application No. PCT/EP2022/074686, mailed on Mar. 28, 2024, 13 pages (6 pages of English Translation and 7 pages of Original Document).
Kirk Cantor, "Extruder Hardware Systems", Blown Film Extrusion, Edition2, 2011, pp. 37-38.
Mark, et al., "Films", Encyclopedia Of Polymer Science And Engineering, vol. 7, Edition 2, 1987, pp. 73-127.
Mark, et al., "Packaging Materials", Encyclopedia Of Polymer Science And Engineering, vol. 10, 1987, pp. 684-695.
Zoran Savic, "Advances in the manufacture of sausage casings", Woodhead Publishing, Edition 1, Jun. 22, 2012, pp. 377-405.
International Search Report and Written Opinion received for PCT Patent Application No. PCT/EP2022/074686, mailed on Nov. 17, 2022, 8 pages.
Iwabuchi, et al., "Preparation of regularly sequenced polyamides with definite numbers of oxyethylene units and their application as phase transfer catalysts", Die Makromolekulare Chemie, vol. 184, Issue 3, Mar. 1983, pp. 535-543.

* cited by examiner

TUBULAR CASING (S) FOR FOOD, CONTAINING AT LEAST ONE COPOLYAMIDE COMPOSED OF AT LEAST ONE LACTAM, A DICARBOXYLIC ACID AND 1,5-DIAMINO-3-OXAPENTANE

CROSS-REFERENCE TO RELATED APPLICATIONS

This application is a National stage application (under 35 U.S.C. § 371) of PCT/EP2022/074686, filed Sep. 6, 2022, which claims benefit of European Application No. 21197333.4, filed Sep. 17, 2021, both of which are incorporated herein by reference in their entirety.

Tubular casing (S) for food, containing at least one copolyamide composed of at least one lactam, a dicarboxylic acid and 1,5-diamino-3-oxapentane The present invention relates to a tubular casing (S) for food produced by polymerizing a lactam (A) and a monomer mixture (M), where the monomer mixture (M) comprises 1,5-diamino-3-oxapentane. The present invention further relates to the use of the tubular casing as a packaging casing, particularly a sausage casing.

Polyamides are of particular importance in industry, since they feature very good mechanical properties and especially have high strength and toughness, good chemical stability, and high abrasion resistance. They are used for example for the production of fishing lines, climbing ropes and carpets. Furthermore, polyamides find use for the production of packaging films and packaging casings.

An overview of the use as packaging films and packaging casings and processes for the production thereof is described for example in Encyclopedia of Polymer Science and Engineering, 2nd edition, vol. 7, pp. 73-127; vol. 10, pp. 684-695 (John Wiley & Sons 1987). However, the polyamide films described therein are very stiff and have low tear propagation resistance.

Packaging casings made of polyamide (PA) generally emerged in the 1970s and 1980s. Sausage casings form a large group of packaging casings. There are essentially two types of sausage casings:

Firstly, impermeable packaging casings in which meat products are stored and distributed and should therefore offer certain oxygen and water barrier properties in order to avoid food spoilage and to extend the shelf life.

Secondly, permeable packaging casings in which meat products are not storage-stable (they have to be repackaged for further distribution). Such packagings have the functions of shaping and protecting the meat during the drying, aging or smoking.

Permeable sausage casings should therefore have a high water vapor transmission rate (VVTR) since the water in the meat has to exit from the casing during the drying, and a casing suitable for smoking requires the casing to be smoke-permeable so that the meat filling can be reached. Permeable packaging casings in particular include casings made of materials, such as cellulose casings, fibrous casings and collagen casings. The production costs for these permeable packaging casings are very high. (Savic, 14—Advances in the manufacture of sausage casings, in Advances in Meat, Poultry and Seafood Packaging (Ed.: J. P. Kerry), Woodhead Publishing, 2012, pp. 377-405). In addition, due to their low strength, these casings are relatively thick, and a lot of material has to be used in order to form a sausage casing.

Animal intestines offer the highest water vapor permeability, but are also very expensive and their irregular shapes and strength mean that they are of only limited suitability for industrial sausage production.

Sausage casings produced from polyamide (PA) 6 are inexpensive to produce, but their low WVTR means that they are unsuitable for the production of smoked or dry/semi-dry sausage products.

Figure 1:
FIG. 1 is an image showing the experimental setup used to determine water permeability.

The object on which the present invention is based was therefore that of providing a tubular casing (S) comprising a polyamide and having the disadvantages of the tubular casings (S) for food described in the prior art only to a reduced degree, if at all, i.e. having a higher WVTR (water vapor transmission) and being suitable for the production of smoked or dry/semi-dry sausage products. The tubular casing (S) should also be producible as simply and cost-effectively as possible.

This object was achieved by a tubular casing (S) for food, comprising at least one copolyamide (CoPA), produced by polymerizing the following components:

(A) 60-95% by weight of at least one lactam and (B) 5-40% by weight of a monomer mixture (M) comprising the following components:

(B1) at least one $C_4$-$C_{12}$ dicarboxylic acid and (B2) at least one diamine, where component (B2) comprises 1,5-diamino-3-oxapentane and where the percentages by weight of components (A) and (B) are each based on the sum total of the percentages by weight of components (A) and (B).

It has surprisingly been found that the tubular casing (S) for food according to the invention has high water vapor permeability and suitable mechanical properties for producing permeable packagings. In particular, the tubular casing (S) according to the invention has a water vapor permeability (WVP) of at least 2500 g*μm/(m$^2$*d), preferably of at least 3000 g*μm/(m$^2$*d), particularly preferably of at least 3500 g*μm/(m$^2$*d), measured in accordance with ASTM F 1249, at 23° C. and 85% RH.

The tubular casing (S) for food according to the invention also has high tear propagation resistance. Furthermore, the tubular casing (S) according to the invention exhibits reduced oxygen permeability compared to the prior art.

The oxygen permeability, determined in accordance with ASTM F 1927, is less than 1500 cm$^3$*μm/(m$^2$*d*bar), preferably less than 1250 cm$^3$*μm/m$^2$*d*bar), particularly preferably less than 1200 cm$^3$*μm/(m$^2$*d*bar).

The invention is explained in more detail below:

Tubular Casing (S) for Food

According to the invention, the tubular casing (S) comprises at least one copolyamide (CoPA) produced by polymerizing the following components:

(A) 60-95% by weight of at least one lactam and (B) 5-40% by weight of a monomer mixture (M) comprising the following components:

(B1) at least one $C_4$-$C_{12}$ dicarboxylic acid and (B2) at least one diamine, where component (B2) comprises 1,5-diamino-3-oxapentane and where the percentages by weight of components (A) and (B) are each based on the sum total of the percentages by weight of components (A) and (B).

In the context of the present invention, "at least one copolyamide (CoPA)" is understood to mean either exactly one copolyamide (CoPA) or a mixture of two or more copolyamides (CoPA).

The at least one copolyamide (CoPA) is described further below.

The tubular casing (S) has for example a thickness in the range from 0.1 μm to 1 mm, preferably a thickness in the range from 5 μm to 1 mm, particularly preferably in the range from 5 μm to 500 μm, very particularly preferably in the range from 5 μm to 100 μm, and especially preferably in the range from 7.5 μm to 100 μm.

The present invention therefore also provides a polymer film (P), in which the tubular casing (S) has a thickness in the range from 0.1 μm to 1 mm, preferably has a thickness in the range from 5 μm to 1 mm, particularly preferably in the range from 5 μm to 500 μm, very particularly preferably in the range from 5 μm to 100 μm, and especially preferably in the range from 7.5 μm to 100 μm.

The tubular casing (S) may comprise at least one further polymer (FP) in addition to the at least one copolyamide (CoPA).

In the context of the present invention, "at least one further polymer (FP)" means either exactly one further polymer (FP) or a mixture of two or more further polymers (FP).

Polymers suitable as at least one further polymer (FP) are all polymers known to those skilled in the art. It will be apparent that the at least one further polymer (FP) is different than the at least one copolyamide (CoPA).

Preferably, the at least one further polymer (FP) is selected from the group consisting of polyolefins, ethylene-vinyl alcohols, ethylene-vinyl acetates, polyethylene terephthalates, polyvinylidene chlorides, maleic anhydride-grafted polyolefins, polyesters, polyamides, and ionomers. Particularly preferably, the at least one further polymer (FP) is selected from the group consisting of polyolefins, poly(ethylene-vinyl alcohols), poly(ethylene-vinyl acetates), polyethylene terephthalates, polyvinylidene chlorides, polyamide 6, polyamide 6/66, and maleic anhydride-grafted polyolefins. Most preferably, the at least one further polymer (FP) is selected from the group consisting of ethylene-vinyl alcohols, polyolefins and maleic anhydride-grafted polyolefins, polyamide 6 and polyamide 6/66, with particular preference being given to ethylene-vinyl alcohols.

If the at least one further polymer (FP) is selected from the group consisting of polyolefins, it is preferable that, in addition, maleic anhydride-grafted polyolefins are used as at least one further polymer (FP). It is possible here that the at least one further polymer (FP) used is a mixture of polyolefins and maleic anhydride-grafted polyolefins. It is also possible that, if the tubular casing (S) is a multilayer film described further below, the tubular casing (S) comprises at least one first further layer of at least one further polymer (FP), where the at least one further polymer (FP) of the first further layer is selected from the group consisting of maleic anhydride-grafted polyolefins, and the tubular casing (S) comprises at least one second further layer of at least one further polymer (FP), where the at least one further polymer (FP) of the second further layer is selected from the group consisting of polyolefins. The tubular casing (S) in that case preferably comprises the first further layer between the first layer comprising the at least one copolyamide (CoPA) and the second further layer.

Polyolefins per se are known to those skilled in the art. Preferred polyolefins are polypropylene (PP), low-density polyethylene (LDPE), linear low-density polyethylene (LLDPE), and very-low-density polyethylene (VLDPE).

Linear low-density polyethylene (LLDPE) is a copolymer of ethylene and at least one $C_4$-$C_8$ α-olefin. Linear low-density polyethylene (LLDPE) features long polymer chains with short side chains. The length of the side chains in linear low-density polyethylene (LLDPE) is typically shorter than in low-density polyethylene (LDPE) and in medium-density polyethylene (MDPE). The melting point of linear low-density polyethylene (LLDPE) is preferably in the range from 110° C. to 130° C.; its density is in the range from 0.91 to 0.93 g/cm$^3$.

Very-low-density polyethylenes (VLDPE) are copolymers of ethylene and at least one $C_4$-$C_8$ α-olefin. They typically have a melting point in the range from 110° C. to 130° C. and a density in the range from 0.86 to 0.91 g/cm$^3$. The proportion of $C_4$-$C_8$ α-olefins in VLDPE is generally higher than in LLDPE.

In the context of the present invention, "$C_4$-$C_8$ α-olefins" are understood to mean linear and branched, preferably linear, alkylenes having 4 to 8 carbon atoms that are unsaturated in the a position, i.e. have a C—C double bond in the a position. Examples of these are 1-butene, 1-pentene, 1-hexene, 1-heptene, and 1-octene. 1-Butene, 1-hexene, and 1-octene are preferred.

Preferred poly(ethylene-vinyl acetates) are copolymers of ethylene with vinyl acetate. For example, they are produced using in the range from 82% to 99.9% by weight of ethylene and in the range from 0.1% to 18% by weight of vinyl acetate, preferably in the range from 88% to 99.9% by weight of ethylene and in the range from 0.01% to 12% by weight of vinyl acetate.

Preferred poly(ethylene-vinyl alcohols) are obtainable by complete or partial hydrolysis of the above-described poly(ethylene-vinyl acetates). For example, the poly(ethylene-vinyl alcohols) comprise in the range from 50 to 75 mol % of ethylene and in the range from 25 to 50 mol % of vinyl alcohol, based on the total molar amount of the poly(ethylene-vinyl alcohols).

The tubular casing (S) may comprise the at least one further polymer (FP) as a blend (mixture) with the at least one copolyamide (CoPA). Particular preference is given to blends of the at least one copolyamide (CoPA) and polyamide 6 and/or polyamide 6/66.

Furthermore, it is possible and preferable according to the invention that the tubular casing (S) comprises at least one first layer comprising the at least one copolyamide (CoPA), and the tubular casing (S) comprises at least one further layer comprising the at least one further polymer (FP).

In this embodiment, it is preferable that the at least one first layer comprising the at least one copolyamide (CoPA) does not comprise any further polymer (FP).

In the context of the present invention, "at least one first layer" means either exactly one first layer or two or more first layers.

In the context of the present invention, "at least one further layer" means either exactly one further layer or two or more further layers. Two or more further layers are preferred.

It is thus preferable that the tubular casing (S) comprises at least one first layer comprising the at least one copolyamide (CoPA), and the tubular casing (S) also comprises at least one further layer, where the at least one further layer comprises at least one further polymer (FP) selected from the group consisting of polyolefins, poly(ethylene-vinyl alcohols), poly(ethylene-vinyl acetates), polyethylene terephthalates, polyvinylidene chlorides, polyamide 6, polyamide 6/66, and maleic anhydride-grafted polyolefins.

The present invention thus also provides a tubular casing (S) which comprises at least one first layer comprising the at least one copolyamide (CoPA), and the tubular casing (S) comprises at least one further layer, where the at least one further layer comprises at least one further polymer (FP) selected from the group consisting of polyolefins, poly (ethylene-vinyl alcohols), poly(ethylene-vinyl acetates), polyethylene terephthalates, polyvinylidene chlorides, polyamide 6, polyamide 6/66, and maleic anhydride-grafted polyolefins.

If the tubular casing (S), apart from the at least one first layer, does not comprise any further layer, the tubular casing (S) is also referred to as a monofilm casing. If the tubular casing (S) is a monofilm casing, it may comprise exactly one first layer and no further layer; it is likewise possible that it comprises two or more first layers and no further layer. If the tubular casing (S) comprises two or more first layers and if it is a monofilm casing, the two or more first layers all have the same composition.

If the tubular casing (S) comprises at least one first layer comprising the at least one copolyamide (CoPA) and at least one further layer comprising the at least one further polymer (FP), the tubular casing (S) is also referred to as a multilayer film casing.

For example, the tubular casing (S) in that case comprises 1 to 11 first layers comprising the at least one copolyamide (CoPA), and 1 to 13 further layers comprising the at least one further polymer (FP). Preferably, the tubular casing (S) comprises 1 to 5 first layers comprising the at least one copolyamide (CoPA), and 1 to 11 further layers comprising the at least one further polymer (FP). Especially preferably, the tubular casing (S) comprises 1 to 3 first layers comprising the at least one copolyamide (CoPA), and 1 to 7 further layers comprising the at least one further polymer (FP).

In a preferred embodiment of the present invention, the at least one first layer consists of the at least one copolyamide (CoPA). It is likewise preferable that the at least one further layer consists of the at least one further polymer (FP).

In the context of the present invention, the term "tubular casing (S)" thus encompasses both monofilm casings and multilayer film casings.

The present invention therefore also provides a tubular casing (S) where the tubular casing (S) is a monofilm casing or a multilayer film casing.

As described above, the tubular casing (S) typically has a thickness in the range from 0.1 μm to 1 mm, preferably a thickness in the range from 5 μm to 1 mm, particularly preferably in the range from 5 μm to 500 μm, very particularly preferably in the range from 5 μm to 100 μm, and especially preferably in the range from 7.5 μm to 100 μm.

If the tubular casing (S) is a monofilm casing and if it comprises exactly one first layer, the first layer has the same thickness as the tubular casing (S), i.e. for example in the range from 0.1 μm to 1 mm, preferably a thickness in the range from 5 μm to 1 mm, particularly preferably in the range from 5 μm to 500 μm, very particularly preferably in the range from 5 μm to 100 μm, and especially preferably in the range from 7.5 μm to 100 μm. If the tubular casing (S) is a monofilm casing and if it comprises two or more first layers, the thickness of every first layer is less than the thickness of the tubular casing (S). The sum total of the thicknesses of the individual first layers in that case generally corresponds to the thickness of the tubular casing (S). For example, the at least one first layer comprising the at least one copolyamide (CoPA) in that case has a thickness in the range from 0.1 to 100 μm, preferably in the range from 0.5 to 100 μm, particularly preferably in the range from 1.0 to 50 μm, and especially preferably in the range from 1.5 to 15 μm.

If the tubular casing (S) is a multilayer film casing, the thickness of the individual layers of the tubular casing (S), i.e. the thickness of the at least one first layer comprising the at least one copolyamide (CoPA), and the thickness of the at least one further layer comprising the at least one further polymer (FP), is typically less than the thickness of the tubular casing (S). The sum total of the thicknesses of the individual layers in that case generally corresponds to the thickness of the tubular casing (S).

For example, the at least one first layer comprising the at least one copolyamide (CoPA) in that case has a thickness in the range from 0.1 μm to 100 μm, preferably in the range from 0.5 μm to 100 μm, particularly preferably in the range from 1 μm to 50 μm, and especially preferably in the range from 1.5 μm to 15 μm.

The at least one further layer comprising the at least one further polymer (FP) in that case has for example a thickness in the range from 0.1 μm to 100 μm, preferably in the range from 0.5 to 100 μm, particularly preferably in the range from 1 to 50 μm, and especially preferably in the range from 1.5 to 15 μm.

The tubular casing (S) may comprise at least one adhesion promoter. This embodiment is preferred if the tubular casing (S) is a multilayer film casing.

In the context of the present invention, "at least one adhesion promoter" means either exactly one adhesion promoter or a mixture of two or more adhesion promoters.

If the tubular casing (S) is a multilayer film casing, the at least one adhesion promoter may be present together with the at least one copolyamide (CoPA) in the at least one first layer. It is likewise possible that the at least one adhesion promoter is present together with the at least one further polymer (FP) in the at least one further layer. Furthermore, it is possible that the at least one adhesion promoter is present as at least one additional layer in the tubular casing (S). This embodiment is preferred.

If the at least one adhesion promoter is present as at least one additional layer in the tubular casing (S), this at least one additional layer is preferably arranged between the at least one further layer comprising the at least one further polymer (FP) and the at least one first layer comprising the at least one copolyamide (CoPA). The at least one layer of the adhesion promoter has for example a thickness of 0.1 to 100 μm, preferably in the range from 0.5 to 50 μm and especially preferably in the range from 0.5 to 15 μm.

Suitable adhesion promoters are known per se to those skilled in the art. Preferred adhesion promoters are copolymers of ethylene with maleic anhydride or a copolymer of ethylene with vinyl acetate. Preference is given to a maleic anhydride-grafted linear low-density polyethylene (LLDPE) or a copolymer of ethylene and vinyl acetate, the copolymer being produced using >18% by weight of vinyl acetate and <82% by weight of ethylene. Preferred adhesion promoters are commercially available, for example under the Bynel 4105 trade name from DuPont or Escorene FL00119 trade name from Exxon.

The tubular casing (S) may also comprise additives. Such additives are known to those skilled in the art and are selected for example from the group consisting of stabilizers, dyes, antistats, tackifiers, antiblocking agents, processing aids, antioxidants, light stabilizers, UV absorbers, lubricants, and nucleating aids.

Suitable dyes are organic and inorganic pigments, for example sized titanium dioxide. Suitable tackifiers are for example polyisobutylene (PIB) or ethylene-vinyl acetate (EVA). Suitable antiblocking agents are for example silicon dioxide or calcium carbonate particles. Suitable light stabilizers are for example what are called HALS (hindered amine light stabilizers). Processing aids or lubricants used may for example be ethylenebisstearamide (EBS) wax. Nucleating aids may for example be all kinds of organic or inorganic crystallization nucleating agents, for example talc.

The additives may be present either in the at least one first layer or in the at least one further layer. They may be present in just one of these layers; it is likewise possible that they are present in each of these layers.

The tubular casing according to the invention, if it is in the form of a monofilm casing, has reduced oxygen permeability and increased water vapor permeability compared to a tubular casing from the prior art made of polyamide 6.

Copolyamide (CoPA)

According to the invention, the copolyamide (CoPA) is produced by polymerizing the following components:

(A) 60-95% by weight of at least one lactam and (B) 5-40% by weight of a monomer mixture (M) comprising the following components:

(B1) at least one $C_4$-$C_{12}$ dicarboxylic acid and (B2) at least one diamine, where component (B2) comprises 1,5-diamino-3-oxapentane and where the percentages by weight of components (A) and (B) are each based on the sum total of the percentages by weight of components (A) and (B).

According to the invention, the tubular casing (S) comprises at least one copolyamide (CoPA).

In the context of the present invention, the terms "component A" and "at least one lactam" are used synonymously and therefore have the same meaning.

The same applies to the terms "component (B)" and "a monomer mixture (M)". These terms are likewise used synonymously in the context of the present invention and therefore have the same meaning.

In the context of the present invention, "at least one lactam" means either exactly one lactam or a mixture of two or more lactams. Preference is given to exactly one lactam.

According to the invention, the at least one copolyamide (CoPA) is produced by polymerizing 60% to 95% by weight of component (A) and 5% to 40% by weight of component (B); preferably, the at least one copolyamide (CoPA) is produced by polymerizing 65% to 90% by weight of component (A) and 10% to 35% by weight of component (B); very particularly preferably, the at least one copolyamide (CoPA) is produced by polymerizing 70% to 85% by weight of component (A) and 15% to 30% by weight of component (B); especially preferably, the at least one copolyamide (CoPA) is produced by polymerizing 60% to 85% by weight of component (A) and 15% to 40% by weight of component (B), where the percentages by weight of components (A) and (B) are each based on the sum total of the percentages by weight of components (A) and (B).

Preferably, the sum total of the percentages by weight of components (A) and (B) is 100% by weight.

It will be apparent that the percentages by weight of components (A) and (B) are based on the percentages by weight of components (A) and (B) prior to the polymerization, i.e. when components (A) and (B) have not yet reacted with one another. During the polymerization, the weight ratio of components (A) and (B) may change.

According to the invention, the copolyamide is produced by polymerizing components (A) and (B). The polymerization of components (A) and (B) is known to those skilled in the art. Typically, the polymerization of components (A) and (B) is a condensation reaction. During the condensation reaction, component (A) reacts with components (B1) and (B2) present in component (B). This forms amide bonds between the individual components. Typically, component (A) is at least partly in open-chain form, i.e. as the amino acid, during the polymerization.

The polymerization of components (A) and (B) can take place in the presence of a catalyst. Suitable catalysts are all catalysts known to those skilled in the art that catalyze the polymerization of components (A) and (B). Preferred catalysts are phosphorus compounds, for example sodium hypophosphite, phosphorous acid, triphenylphosphine or triphenyl phosphite.

The polymerization of components (A) and (B) forms the copolyamide, which therefore gains structural units derived from component (A) and structural units derived from component (B). Structural units derived from component (B) comprise structural units derived from components (B1) and (B2).

The polymerization of components (A) and (B) forms the copolyamide (CoPA) as a copolymer. The copolymer may be a random copolymer but it may likewise be a block copolymer. The copolyamide (CoPA) is preferably a random copolymer.

The present invention therefore also provides a tubular casing (S) in which the at least one copolyamide (CoPA) is a random copolymer.

In a block copolymer there is formation of blocks of units derived from component (B) and blocks of units derived from component (A). These alternate.

In a random copolymer there is alternation of structural units derived from component (A) with structural units derived from component (B). This alternation occurs randomly; for example, two structural units derived from component (B) may be followed by one structural unit derived from component (A), which is followed in turn by one structural unit derived from component (B), which is then followed by a structural unit comprising three structural units derived from component (A).

The production of the at least one copolyamide preferably comprises the following steps:

a) polymerizing components (A) and (B) to obtain at least one first copolyamide, b) pelletizing the at least one first copolyamide obtained in step a) to obtain at least one pelletized copolyamide, c) extracting the at least one pelletized copolyamide obtained in step b) with water to obtain at least one extracted copolyamide, d) drying the at least one extracted copolyamide obtained in step c) at a temperature ($T_T$) to obtain the at least one copolyamide.

The present invention therefore also provides a tubular casing (S) for food in which the copolyamide (CoPA) is produced in a process comprising the following steps:

a) polymerizing components (A) and (B) to obtain at least one first copolyamide, b) pelletizing the at least one first copolyamide obtained in step a) to obtain at least one pelletized copolyamide, c) extracting the at least one pelletized copolyamide obtained in step b) with water to obtain at least one extracted copolyamide, d) drying the at least one extracted copolyamide obtained in step c) at a temperature ($T_T$) to obtain the at least one copolyamide.

The polymerization in step a) may take place in any reactors known to those skilled in the art. Preference is given to stirred-tank reactors. In addition, it is possible to use auxiliaries for improving reaction control known to those skilled in the art, for example defoamers such as polydimethylsiloxane (PDMS), or for example an aqueous solution of sodium hypophosphite ("NHP", e.g. 0.2% by weight) as a catalyst.

In step b), the at least one first copolyamide obtained in step a) may be pelletized by any methods known to those skilled in the art, for example by strand pelletization or underwater pelletization.

The extraction in step c) may be effected by any methods known to those skilled in the art.

During the extraction in step c), by-products formed in step a) during the polymerization of components (A) and (B) are typically extracted from the at least one pelletized copolyamide.

In step d), the at least one extracted copolyamide obtained in step c) is dried. Processes for drying are known to those skilled in the art. According to the invention, the at least one extracted copolyamide is dried at a temperature ($T_T$). The temperature ($T_T$) is preferably above the at least one glass transition temperature ($T_{G(C)}$) of the at least one copolyamide and below the melting temperature ($T_{M(C)}$) of the at least one copolyamide.

The drying in step d) is typically carried out for a period in the range from 1 to 100 hours, preferably in the range from 2 to 50 hours, and especially preferably in the range from 3 to 40 hours.

It is thought that the drying in step d) further increases the molecular weight of the at least one copolyamide.

The at least one copolyamide (CoPA) typically has at least one glass transition temperature ($T_{G(C)}$). The at least one glass transition temperature ($T_{G(C)}$) is for example in the range from 30° C. to 70° C., preferably in the range from 40° C. to 68° C., and especially preferably in the range from 45° C. to 65° C., determined by means of ISO 11357-2:2013.

The present invention therefore also provides a polymer film (P) in which the at least one copolyamide (CoPA) has at least one glass transition temperature ($T_{G(C)}$) that is in the range from 30° C. to 70° C.

In the context of the present invention, the glass transition temperature ($T_{G(C)}$) of the at least one copolyamide relates to the glass transition temperature ($T_{G(C)}$) of the dry copolyamide in accordance with ISO 11357-2:2013.

In the context of the present invention, "dry" means that the at least one copolyamide (CoPA) comprises less than 1% by weight, preferably less than 0.5% by weight and especially preferably less than 0.1% by weight of water, based on the total weight of the at least one copolyamide (CoPA). More preferably, "dry" means that the at least one copolyamide (CoPA) does not comprise any water, and most preferably that the at least one copolyamide (CoPA) also does not comprise any solvent.

Furthermore, the at least one copolyamide (CoPA) typically has a melting temperature ($T_{M(C)}$). The melting temperature ($T_{M(C)}$) of the at least one copolyamide (CoPA) is for example in the range from 100° C. to 210° C., preferably in the range from 150° C. to 210° C., and especially preferably in the range from 180° C. to 210° C., determined in accordance with ISO 11357-3:2011.

The present invention therefore also provides a polymer film (P) in which the at least one copolyamide (CoPA) has a melting temperature ($T_{M(C)}$), where the melting temperature ($T_{M(C)}$) is in the range from 100° C. to 210° C., preferably 150° C. to 210° C.

The at least one copolyamide generally has a viscosity number ($VN_{(C)}$) in the range from 150 to 300 ml/g, determined in a 0.5% by weight solution of the at least one copolyamide in a mixture of phenol/o-dichlorobenzene in a weight ratio of 1:1. The determination is carried out as described in EN ISO 307:2007+Amd 1:2013, the only difference being that a mixture of phenol/o-dichlorobenzene in a weight ratio of 1:1 is used instead of the described solvent sulfuric acid.

Preferably, the viscosity number ($VN_{(C)}$) of the at least one copolyamide is in the range from 160 to 290 ml/g and particularly preferably in the range from 170 to 280 ml/g, determined in a 0.5% by weight solution of the at least one copolyamide in a mixture of phenol/o-dichlorobenzene in a weight ratio of 1:1.

The present invention therefore also provides a polymer film (P) in which the at least one copolyamide has a viscosity number ($VN_{(C)}$) in the range from 150 to 300 ml/g, determined in a 0.5% by weight solution of the at least one copolyamide in a mixture of phenol/o-dichlorobenzene in a weight ratio of 1:1.

The at least one copolyamide (CoPA) preferably does not comprise any polyoxyalkylene groups.

Component (A)

Component (A) is at least one lactam.

Lactams are known per se to those skilled in the art. Preferred according to the invention are lactams having 4 to 12 carbon atoms.

In the context of the present invention, "lactams" are understood to mean cyclic amides having preferably 4 to 12, particularly preferably 6 to 12, carbon atoms in the ring.

Suitable lactams are selected for example from the group consisting of 3-aminopropanolactam (propio-3-lactam; β-lactam; β-propiolactam), 4-aminobutanolactam (butyro-4-lactam; γ-lactam; γ-butyrolactam), 5-aminopentanolactam (2-piperidinone; δ-lactam; δ-valerolactam), 6-aminohexanolactam (hexano-6-lactam; ε-lactam; ε-caprolactam), 7-aminoheptanolactam (heptano-7-lactam; (ζ-lactam; (ζ-heptanolactam), 8-aminooctanolactam (octano-8-lactam; η-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano-11-lactam; ω-undecanolactam), and 12-aminododecanolactam (dodecano-12-lactam; ω-dodecanolactam).

The present invention therefore also provides a tubular casing (S) for food in which component (A) is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam, and 12-aminododecanolactam.

Particularly preferably, component (A) is selected from the group consisting of 6-aminohexanolactam and 12-aminododecanolactam.

Very particularly preferably, component (A) is 6-aminohexanolactam.

The lactams may be unsubstituted or at least monosubstituted. Where at least monosubstituted lactams are used, the nitrogen atom and/or the ring carbon atoms thereof may bear one, two, or more substituents selected independently of one another from the group consisting of $C_1$, to $C_{10}$ alkyl, $C_5$ to $C_6$ cycloalkyl, and $C_5$ to $C_{10}$ aryl.

Suitable $C_1$ to $C_{10}$ alkyl substituents are for example methyl, ethyl, propyl, isopropyl, n-butyl, sec-butyl, and tert-butyl. One suitable $C_5$ to $C_6$ cycloalkyl substituent is for example cyclohexyl. Preferred $C_5$ to $C_{10}$ aryl substituents are phenyl and anthranyl.

Preference is given to using unsubstituted lactams, with γ-lactam (γ-butyrolactam), δ-lactam (δ-valerolactam) and ε-lactam (ε-caprolactam) being preferred. Particular preference is given to δ-lactam (δ-valerolactam) and ε-lactam (ε-caprolactam), with ε-caprolactam being especially preferred.

Component (B)

According to the invention, component (B) is a monomer mixture (M). The monomer mixture (M) comprises components (B1), at least one $C_4$-$C_{12}$ dicarboxylic acid, and (B2), at least one diamine, where one of the diamines (B2) is 1,5-diamino-3-oxapentane.

In the context of the present invention, a monomer mixture (M) is understood to mean a mixture of two or more monomers, where at least components (B1) and (B2) are present in the monomer mixture (M).

The monomer mixture (M) comprises for example in the range from 45 to 55 mol % of component (B1) and in the range from 45 to 55 mol % of component (B2), in each case based on the sum total of the molar percentages of components (B1) and (B2), preferably based on the total molar amount of the monomer mixture (M).

Preferably, component (B) comprises in the range from 47 to 53 mol % of component (B1) and in the range from 47 to 53 mol % of component (B2), in each case based on the sum total of the molar percentages of components (B1) and (B2), preferably based on the total molar amount of component (B).

Particularly preferably, component (B) comprises in the range from 49 to 51 mol % of component (B1) and in the range from 49 to 51 mol % of component (B2), in each case based on the sum total of the molar percentages of components (B1) and (B2), preferably based on the total molar amount of component (B).

The present invention therefore also provides a tubular casing (S) for food in which component (B) comprises in the range from 45 to 55 mol % of component (B1) and in the range from 45 to 55 mol % of component (B2), in each case based on the total molar amount of component (B).

The sum total of the molar percentages of components (B1) and (B2) present in component (B) typically adds up to 100 mol %.

It is preferable that the monomer mixture (M) does not comprise any polyoxyalkylene groups.

The monomer mixture (M) may further comprise water.

Component (B1)

According to the invention, component (B1) is at least one $C_4$-$C_{12}$ dicarboxylic acid.

In the context of the present invention, the terms "component (B1)" and "at least one $C_4$-$C_{12}$ dicarboxylic acid" are used synonymously and therefore have the same meaning.

In the context of the present invention, "at least one $C_4$-$C_{12}$ dicarboxylic acid" (B1) means either exactly one $C_4$-$C_{12}$ dicarboxylic acid or a mixture of two or more $C_4$-$C_{12}$ dicarboxylic acids.

In the context of the present invention, "$C_4$-$C_{12}$ dicarboxylic acid" is understood to mean aliphatic and/or aromatic compounds having 2 to 10 carbon atoms and two carboxyl groups (—COOH groups). The aliphatic and/or aromatic compounds may be unsubstituted or additionally at least monosubstituted. Where the aliphatic and/or aromatic compounds are additionally at least monosubstituted, they may bear one, two or more substituents that do not take part in the polymerization of components (A) and (B). Substituents of this kind are known to those skilled in the art and are for example alkyl or cycloalkyl substituents. Preferably, the at least one $C_4$-$C_{12}$ dicarboxylic acid is unsubstituted.

Suitable components (B1) are for example selected from the group consisting of butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, terephthalic acid and isophthalic acid.

Preferably, component (B1) is selected from the group consisting of pentanedioic acid (glutaric acid), hexanedioic acid (adipic acid), decanedioic acid (sebacic acid), dodecanedioic acid, terephthalic acid and isophthalic acid.

Very particularly preferably, component (B1) is hexanedioic acid (adipic acid).

The present invention therefore also provides a polymer film (P) in which component (B1) is selected from the group consisting of pentanedioic acid, hexanedioic acid, decanedioic acid, dodecanedioic acid, terephthalic acid and isophthalic acid.

Especially preferably, component (B1) is hexanedioic acid (adipic acid).

Component (B2)

In the context of the present invention, these terms "component (B2)" and "at least one second diamine" are used synonymously and therefore have the same meaning.

In the context of the present invention, "at least one second diamine" (B2) is understood to mean either exactly one diamine (B2) or a mixture of two or more diamines (B2). Preferred according to the invention is exactly one diamine (B2).

According to the invention, component (B2) comprises 1,5-diamino-3-oxapentane. For example, component (B2) comprises at least 50 mol %, preferably at least 80 mol % and especially preferably at least 95 mol % of 1,5-diamino-3-oxapentane, in each case based on the total molar amount of component (B2). Most preferably, component (B2) consists of 1,5-diamino-3-oxapentane.

Furthermore, component (B2) may comprise further diamines. Suitable further diamines are known per se to those skilled in the art and are for example butane-1,4-diamine, pentamethylenediamine or hexamethylenediamine.

For example, component (B2) comprises in the range from 50 to 99.9 mol % of 1,5-diamino-3-oxapentane and in the range from 0.1 to 50 mol % of hexamethylenediamine, in each case based on the total molar amount of component (B2).

The sum total of the mol % of components (B1) and (B2) present in component (B) typically adds up to 100 mol %.

Particularly preferably, component (B2) consists of 1,5-diamino-3-oxapentane. In that case, component (B2) does not comprise any further diamine.

It is therefore particularly preferable that component (B) consists of components (B1), adipic acid, and (B2), 1,5-diamino-3-oxapentane.

Production of the Tubular Casing (S) for Food

The terms "tubular casing (S)" and "tubular casing (S) for food" are used redundantly.

The tubular casing (S) according to the invention is preferably produced in a process comprising the following steps:

i) providing at least one copolyamide produced by polymerizing the following components:
   (A) 60-95% by weight of at least one lactam
   (B) 5-40% by weight of a monomer mixture (M) comprising (B1) at least one $C_4$-$C_{12}$ dicarboxylic acid and (B2) at least one diamine, where component (B2) comprises 1,5-diamino-3-oxapentane and where the percentages by weight of components (A) and (B) are each based on the sum total of the percentages by weight of components (A) and (B), in molten form in a first extruder, ii) extruding the at least one copolyamide provided in step i) in molten form from the first extruder through a die to obtain a film of at least one copolyamide in molten form, iii) cooling the film of the at least one copolyamide in molten form obtained in step ii), where the at least one copolyamide solidifies to obtain the tubular casing (S) or to obtain a polymer film from which the tubular casing (S) can be manufactured.

The present invention therefore also provides a process for producing the tubular casing (S) according to the invention, comprising the following steps:

i) providing at least one copolyamide produced by polymerizing the following components:

(A) 60-95% by weight of at least one lactam (B) 5-40% by weight of a monomer mixture (M) comprising (B1) at least one $C_4$-$C_{12}$ dicarboxylic acid and (B2) at least one diamine, where component (B2) comprises 1,5-diamino-3-oxapentane and where the percentages by weight of components (A) and (B) are each based on the sum total of the percentages by weight of components (A) and (B), in molten form in a first extruder, ii) extruding the at least one copolyamide provided in step i) in molten form from the first extruder through a die to obtain a film of at least one copolyamide in molten form, iii) cooling the film of the at least one copolyamide in molten form obtained in step ii), where the at least one copolyamide solidifies to obtain the tubular casing (S) or to obtain a polymer film from which the tubular casing (S) can be manufactured.

In step i), the at least one copolyamide is provided in molten form in a first extruder.

In the context of the present invention, "a first extruder" means either exactly one first extruder or two or more first extruders. Typically, as many first extruders are used as the number of first layers comprising the at least one copolyamide that are to be present in the tubular casing (S).

If the tubular casing (S) is for example to comprise exactly one first layer comprising the at least one copolyamide, then exactly one first extruder is used. If the tubular casing (S) is to comprise exactly two first layers comprising the at least one copolyamide, then exactly two first extruders are used. If the tubular casing (S) is to comprise exactly five first layers comprising the at least one copolyamide, then exactly five first extruders are used.

For example, 1 to 11 first extruders are used, preferably 1 to 5 first extruders and particularly preferably 1 to 3 first extruders.

The elucidations and preferences described above for the at least one copolyamide present in the tubular casing (S) apply correspondingly to the at least one copolyamide provided in step i).

According to the invention, the at least one copolyamide is provided in molten form.

In the context of the present invention, "in molten form" means that the at least one copolyamide is provided at a temperature above the melting temperature ($T_{M(C)}$) of the at least one copolyamide. "In molten form" thus means that the at least one copolyamide is at a temperature above the melting temperature ($T_{M(C)}$) of the at least one copolyamide. If the at least one copolyamide is in molten form, the at least one copolyamide is free-flowing.

"Free-flowing" means that the at least one copolyamide can be conveyed in the first extruder and that the at least one copolyamide can be extruded from the first extruder.

For example, the at least one copolyamide is provided in step i) at a temperature in the range from 190° C. to 300° C., preferably in the range from 200° C. to 280° C. and especially preferably in the range from 210° C. to 270° C., in each case assuming that the temperature at which the at least one copolyamide is provided is above the melting temperature ($T_{M(C)}$) of the at least one copolyamide.

The at least one copolyamide can be provided in molten form in the first extruder by any methods known to those skilled in the art.

For example, the at least one copolyamide can be supplied to the first extruder in molten or solid form. If the at least one copolyamide is supplied to the first extruder in solid form, it can be supplied to the first extruder for example in the form of pellets and/or of powder. The at least one copolyamide is in that case melted in the first extruder and thus provided in molten form in the first extruder. This embodiment is preferred.

Furthermore, it is possible that components (A) and (B) are polymerized directly in the first extruder and thus the at least one copolyamide is provided in molten form in the first extruder. Processes for this purpose are known to those skilled in the art.

In step ii), the at least one copolyamide in molten form is extruded from the first extruder through a die to obtain a film of the at least one copolyamide in molten form.

In the context of the present invention, "a die" means either exactly one die or two or more dies. Preferred according to the invention is exactly one die.

Suitable dies are all dies known to those skilled in the art that permit extrusion of a film from the at least one copolyamide in molten form. Such dies are for example ring dies or slot dies.

Suitable ring dies and slot dies are known per se to those skilled in the art.

For example, if step i1) described further below is performed, it is preferable that, in step ii), the at least one copolyamide in molten form from the first extruder is brought together in the die, for example in the ring die or in the slot die, with the at least one further polymer (FP) in molten form from the further extruder.

In particular, in step ii), the at least one copolyamide in molten form from the first extruder is brought together in the die with the at least one further polymer (FP) in molten form from the further extruder such that the film of the at least one copolyamide and the at least one further polymer (FP), in each case in molten form, that was obtained in step ii) comprises at least one first layer comprising the at least one copolyamide in molten form, and comprises at least one further layer comprising the at least one further polymer (FP) in molten form.

For example, the thickness of the film of the at least one copolyamide in molten form is in the range from 5 μm to 1 mm, preferably in the range from 5 μm to 1 mm, particularly preferably in the range from 5 μm to 500 μm, very particularly preferably in the range from 5 μm to 100 μm, and especially preferably in the range from 7.5 μm to 100 μm.

The film of the at least one copolyamide in molten form can be for example a flat film or a tubular film. A tubular film is typically obtained when using a ring die as the die and a flat film is obtained when using a slot die as the die.

In step iii), the film of the at least one copolyamide in molten form obtained in step ii) is cooled. This results in solidification of the at least one copolyamide to obtain the polymer film (P).

All methods known to those skilled in the art are suitable for cooling the film of the at least one copolyamide in molten form. For example, the film of the at least one copolyamide in molten form can be cooled by air cooling or water cooling or by contact with a cold surface.

The film of the at least one copolyamide in molten form is cooled in step iii) for example to a temperature below the melting temperature ($T_{M(C)}$) of the at least one copolyamide to obtain the polymer film (P). Preferably, the film of the at least one copolyamide in molten form is cooled in step iii) to a temperature below the at least one glass transition temperature ($T_{G(C)}$) of the at least one copolyamide.

For example, the film of the at least one copolyamide in molten form is cooled in step iii) to a temperature in the range from 0° C. to 100° C., preferably in the range from 10° C. to 80° C., and especially preferably in the range from 15° C. to 70° C., where the temperature to which the film of the at least one copolyamide in molten form is cooled is below the melting temperature ($T_{M(C)}$), preferably below the at least one glass transition temperature ($T_{G(C)}$), of the at least one copolyamide.

The present invention therefore also provides a process for producing a polymer film (P) in which in step iii) the film of the at least one copolyamide in molten form is cooled to a temperature below the melting temperature ($T_{M(C)}$) of the at least one copolyamide.

The elucidations and preferences described above for the tubular casing (S) according to the invention apply correspondingly to the tubular casing (S) obtained in step iii).

Steps ii) and iii) may be carried out successively or simultaneously.

Preferably, a step i1) is additionally carried out in which at least one further polymer (FP) is provided in molten form in a further extruder.

The process for producing a tubular casing (S) for food in that case comprises the following steps:

- i) providing at least one copolyamide produced by polymerizing the following components:
  - (A) 60-95% by weight of at least one lactam
  - (B) 5-40% by weight of a monomer mixture (M) comprising
    - (B1) at least one $C_4$-$C_{12}$ dicarboxylic acid and
    - (B2) at least one diamine, where component (B2) comprises 1,5-diamino-3-oxapentane and where the percentages by weight of components (A) and (B) are each based on the sum total of the percentages by weight of components (A) and (B), in molten form in a first extruder,
- i1) providing at least one further polymer (FP) in molten form in a further extruder,
- ii) extruding the at least one copolyamide provided in step i) in molten form from the first extruder through a die and extruding the at least one further polymer (FP) provided in step i1) in molten form from the further extruder through the die to obtain a film of the at least one copolyamide and the at least one further polymer (FP), in each case in molten form,
- iii) cooling the film of the at least one copolyamide and the at least one further polymer (FP), in each case in molten form, that was obtained in step ii), where the at least one copolyamide and the at least one further polymer (FP) solidifies to obtain the tubular casing or a polymer film from which the tubular casing (S) can be manufactured.

In step i1), the at least one further polymer (FP) is provided in molten form in a further extruder.

In the context of the present invention, "a further extruder" means either exactly one further extruder or two or more further extruders. Preference is given to two or more further extruders.

Preferably, as many further extruders are used as the number of further layers comprising the at least one further polymers (FP) that are to be present in the tubular casing (S). For example, 1 to 13 further extruders are used, preferably 1 to 11 further extruders and especially preferably 1 to 7 further extruders.

If the tubular casing (S) is for example to comprise exactly one further layer comprising the at least one further polymer (FP), then exactly one further extruder is used. If the tubular casing (S) is to comprise exactly two further layers comprising the at least one further polymer (FP), then exactly two further extruders are used. If the tubular casing (S) is to comprise exactly five further layers comprising the at least one further polymer (FP), then exactly five further extruders are used.

The elucidations and preferences described above for the at least one further polymer (FP) optionally present in the tubular casing (S) apply correspondingly to the at least one further polymer (FP).

According to the invention, the at least one further polymer (FP) is provided in step i1) in molten form. "In molten form" means that the at least one further polymer (FP) is provided at a temperature above the melting temperature ($T_{M(FP)}$) of the at least one further polymer (FP). "In molten form" thus means that the at least one further polymer (FP) is at a temperature above the melting temperature ($T_{M(FP)}$) of the at least one further polymer (FP). If the at least one further polymer (FP) is in molten form, the at least one further polymer (FP) is free-flowing.

"Free-flowing" means that the at least one further polymer (FP) can be conveyed in the further extruder and that the at least one further polymer (FP) can be extruded from the further extruder.

For example, the at least one further polymer (FP) is provided in step i1) at a temperature in the range from 120° C. to 350° C., preferably in the range from 130° C. to 300° C. and especially preferably in the range from 140° C. to 250° C., in each case assuming that the temperature at which the at least one further polymer (FP) is provided is above the melting temperature ($T_{M(FP)}$) of the at least one further polymer (FP).

The at least one further polymer (FP) may be provided in molten form in the further extruder by any methods known to those skilled in the art.

For example, the at least one further polymer (FP) can be supplied to the further extruder in molten or solid form. If the at least one further polymer (FP) is supplied to the further extruder in solid form, it can be supplied to the further extruder for example in the form of pellets and/or of powder. The at least one further polymer (FP) is in that case melted in the further extruder and thus provided in molten form in the further extruder.

Step i1) is typically carried out simultaneously with step i).

The elucidations and preferences described above for steps i), ii), and iii) when step i1) is not performed apply to steps i), ii), and iii) when step i1) is performed.

The film of the at least one copolyamide and the at least one further polymer (FP), in each case in molten form, that was obtained in step ii) comprises the at least one copolyamide in at least one first layer and the at least one further polymer (FP) in at least one further layer. Typically, the film obtained in step ii) comprises as many first layers comprising the at least one copolyamide in molten form as the number of first extruders that have been used in step i) and as many further layers comprising the at least one further polymer (FP) in molten form as the number of further extruders that have been used in step i1).

It will be apparent that, when step i1) is carried out, the tubular casing (S) obtained in step iii) is a multilayer film casing.

The tubular casing (S) is preferably stretched. The tubular casing (S) may be stretched after step iii); it is also possible to stretch the tubular casing (S) during step iii), i.e. during the cooling of the film of the at least one copolyamide and of any at least one further polymer (FP).

The present invention therefore also provides a process in which the following step is additionally carried out:

iv) stretching the tubular casing (S) to obtain a stretched tubular casing (vS).

Steps iii) and iv) may be carried out successively or simultaneously.

The stretching of the tubular casing (S) aligns the polymer chains of the at least one copolyamide and can increase the crystallinity of the at least one copolyamide.

It is further possible that the polymer chains of any at least one further polymer (FP) present in the tubular casing (S) are also aligned in the stretching operation. This can also increase the crystallinity of the at least one further polymer (FP).

The stretching can be effected by any methods known to those skilled in the art.

For example, the tubular casing (S) can be stretched by guiding it over at least one roller, preferably a roller system, or by extending the width of the tubular casing. If the tubular casing (S) is directly obtained as a tube, it is also possible for the tubular casing (S) to be stretched by blowing air into the tube and thereby stretching the tubular casing (S). Combinations of the processes are of course also possible.

If the tubular casing (S) is guided over at least one roller, preferably through a roller system, the tubular casing (S) is stretched in the extrusion direction, i.e. in its length. In contrast, if the tubular casing (S) is extended in its width, it is stretched perpendicular to the extrusion direction.

If the tubular casing (S) undergoes stretching by being guided over at least one roller, preferably through a roller system, the polymer chains of the at least one copolyamide and of any at least one further polymer (FP) are aligned parallel to the direction in which it is stretched.

The stretched tubular casing (vS) obtained is uniaxially oriented if the film is only stretched in length. Likewise, the stretched tubular casing (vS) obtained is uniaxially oriented if the tubular casing (S) undergoes stretching by being extended only in its width. In this case too, the polymer chains of the at least one copolyamide and of any at least one further polymer (FP) are aligned parallel to the direction in which it is stretched.

"Uniaxially oriented" means that the polymer chains are aligned essentially in one direction.

If the tubular casing (S) undergoes stretching by being guided through a roller system and additionally being extended in its width, the polymer chains of the at least one copolyamide and of any at least one further polymer (FP) are aligned parallel to both directions in which they are stretched. The stretched tubular casing (vS) obtained is in that case biaxially oriented.

"Biaxially oriented" means that the polymer chains are aligned essentially in two different directions, preferably at right angles to one another.

If the tubular casing (S) is obtained as a tube and the tubular casing (S) is stretched by blowing air into the tube, the stretched tubular casing (vS) obtained is uniaxially oriented.

If the above-described processes for stretching the tubular casing (S) are combined, the tubular casing (S) is thus stretched for example by blowing air into the tube and simultaneously guiding it through a roller system and likewise stretching it in the process, and the stretched tubular casing (S) (vS) obtained is thus biaxially oriented.

The tubular casing (S) is typically stretched at a temperature above the at least one glass transition temperature ($T_{G(C)}$) of the at least one copolyamide and below the melting temperature ($T_{M(C)}$) of the at least one copolyamide. If the tubular casing (S) is a multilayer film casing, it is also preferable that the tubular casing (S) is stretched at a temperature below the melting temperature ($T_{M(FP)}$) of the at least one further polymer (FP), especially preferably at a temperature below the melting temperature of the at least one further polymer (FP) that melts at the lowest temperature.

The tubular casing (S) according to the invention may for example be produced in a casting process, in a blowing process, in a biaxially-oriented polyamide film process (BOPA process) or in a multi-blowing process, with the multi-blowing process being preferred.

The present invention therefore also provides a tubular casing (S) produced in a casting process, in a blowing process, in a biaxially-oriented polyamide film process or in a multi-blowing process.

The casting process, the blowing process, the biaxially-oriented polyamide film process and the multi-blowing process are known per se to those skilled in the art. Typically, the tubular casing (S) is stretched in these processes so that a stretched tubular casing (S) is obtained.

A casting process for producing the polymer film (P) preferably comprises the following steps i-c) to iv-c):

i-c) providing at least one copolyamide produced by polymerizing the following components:
 (A) 60-95% by weight of at least one lactam
 (B) 5-40% by weight of a monomer mixture (M) comprising
  (B1) at least one $C_4$-$C_{12}$ dicarboxylic acid and
  (B2) at least one diamine,
  where component (B2) comprises 1,5-diamino-3-oxapentane and where the percentages by weight of components (A) and (B) are each based on the sum total of the percentages by weight of components (A) and (B), in molten form in a first extruder, ii-c) extruding the at least one copolyamide provided in step i-c) in molten form from the first extruder through a die to obtain a film of the at least one copolyamide in molten form, iii-c) cooling the film of the at least one copolyamide in molten form obtained in step ii-c), where the at least one copolyamide solidifies to obtain the tubular casing (S) or a polymer film from which the tubular casing (S) can be manufactured, iv-c) stretching the tubular casing (S) obtained in step iii-c) by guiding the tubular casing (S) over at least one roller, preferably through a roller system, to obtain a stretched tubular casing (vS).

The elucidations and preferences described above for steps i) to iii) of the process for producing the tubular casing (S) apply correspondingly to steps i-c) to iii-c) of the casting process.

The die used in the casting process in step ii-c) is typically a slot die. The film of the at least one copolyamide in molten form obtained in step ii-c) is therefore preferably a flat film, consequently the polymer film (P) obtained in step iii-c) is preferably a flat film, as is the stretched polymer film (vP) obtained in step iv-c).

In the casting process, steps iii-c) and iv-c) may be carried out successively or simultaneously. In the casting process, steps iii-c) and iv-c) are preferably carried out simultaneously; especially preferably, steps iii-c) and iv-c) are carried out simultaneously and immediately after step ii-c).

It is also preferable that in the casting process, the at least one roller used in step iv-c), preferably the roller system, is cooled during step iv-c).

A blowing process for producing the polymer film (P) preferably comprises the following steps i-b) to iv-b):

i-b) providing at least one copolyamide produced by polymerizing the following components:
   (A) 60-95% by weight of at least one lactam
   (B) 5-40% by weight of a monomer mixture (M) comprising
      (B1) at least one $C_4$-$C_{12}$ dicarboxylic acid and
      (B2) at least one diamine,
      where component (B2) comprises 1,5-diamino-3-oxapentane and where the percentages by weight of components (A) and (B) are each based on the sum total of the percentages by weight of components (A) and (B), in molten form in a first extruder, ii-b) extruding the at least one copolyamide provided in step i-b) in molten form from the first extruder through a die, which is a ring die, to obtain a tubular film of the at least one copolyamide in molten form, iii-b) cooling the tubular film of the at least one copolyamide in molten form obtained in step ii-b), where the at least one copolyamide solidifies to obtain the tubular casing (S), iv-b) stretching the tubular casing (S) obtained in step iii-b) by blowing air into the tube to obtain a stretched tubular casing (vS).

The elucidations and preferences described above for steps i) to iii) of the process for producing the tubular casing (S) apply correspondingly to steps i-b) to iii-b) of the blowing process.

The die used in step ii-b) of the blowing process is preferably a stack die, a helical distributor die or a mixed form thereof. These dies are known to those skilled in the art and are described for example in "*Blown Film Extrusion*" by Kirk Cantor, 2nd Edition, Carl Hanser Verlag, Munich 2011.

In the blowing process, steps iii-b) and iv-b) may be carried out simultaneously or successively. In the blowing process, steps iii-b) and iv-b) are preferably carried out simultaneously.

It will be apparent that if steps iii-b) and iv-b) are carried out simultaneously in the blowing process, then in step iii-b) the tubular film of the at least one copolyamide in molten form obtained in step ii-b) is cooled and is simultaneously stretched by blowing air into the tubular film to obtain the stretched tubular casing (vS).

A biaxially-oriented polyamide film process for producing the tubular casing (S) preferably comprises the following steps i-o) to iv-o):

i-o) providing at least one copolyamide produced by polymerizing the following components:
   (A) 60-95% by weight of at least one lactam
   (B) 5-40% by weight of a monomer mixture (M) comprising
      (B1) at least one $C_4$-$C_{12}$ dicarboxylic acid and
      (B2) at least one diamine,
      where component (B2) comprises 1,5-diamino-3-oxapentane and where the percentages by weight of components (A) and (B) are each based on the sum total of the percentages by weight of components (A) and (B), in molten form in a first extruder, ii-o) extruding the at least one copolyamide provided in step i-o) in molten form from the first extruder through a die to obtain a film of the at least one copolyamide in molten form, iii-o) cooling the film of the at least one copolyamide in molten form obtained in step ii-o), where the at least one copolyamide solidifies to obtain the tubular casing (S) or a polymer film from which the tubular casing (S) can be manufactured (P), iv-o) stretching the tubular casing (S) obtained in step iii-o) by guiding the tubular casing (S) over at least one roller, preferably a roller system, and extending it in its width, to obtain the stretched tubular casing (vS).

The elucidations and preferences described above for steps i) to iii) of the process for producing the tubular casing (S) apply correspondingly to steps i-o) to iii-o) of the biaxially-oriented polyamide film process.

The die used in the biaxially-oriented polyamide film process in step ii-o) is typically a slot die. The film of the at least one copolyamide in molten form obtained in step ii-o) is therefore preferably a flat film, consequently the polymer film obtained in step iii-o) is preferably a flat film, as is the stretched polymer film obtained in step iv-o).

In the biaxially-oriented polyamide film process, steps iii-o) and iv-o) may be carried out successively or simultaneously; preferably, steps iii-o) and iv-o) are carried out successively. In the biaxially-oriented polyamide film process, steps iii-o) and iv-o) are especially preferably carried out successively and the polymer film obtained in step iii-o) is heated before step iv-o). It is preferable here that the polymer film (P) is heated before step iv-o) to a temperature above the at least one glass transition temperature ($T_{G(C)}$) of the at least one copolyamide present in the tubular casing (S) and below the melting temperature ($T_{M(C)}$) of the at least one copolyamide present in the polymer film (P). The polymer film (P) is in that case preferably stretched in step iv-o) at the temperature to which it is heated before step iv-o).

A multi-blowing process for producing the tubular casing (S) preferably comprises the following steps i-m) to iv-m):

i-m) providing at least one copolyamide produced by polymerizing the following components:
   (A) 60-95% by weight of at least one lactam
   (B) 5-40% by weight of a monomer mixture (M) comprising
      (B1) at least one $C_4$-$C_{12}$ dicarboxylic acid and
      (B2) at least one diamine,
      where component (B2) comprises 1,5-diamino-3-oxapentane and where the percentages by weight of components (A) and (B) are each based on the sum total of the percentages by weight of components (A) and (B), in molten form in a first extruder, ii-m) extruding the at least one copolyamide provided in step i-m) in molten form from the first extruder through a die, which is a ring die, to obtain a tubular film of the at least one copolyamide in molten form, iii-m) cooling the tubular film of the at least one copolyamide in molten form obtained in step ii-m), where the at least one copolyamide solidifies to obtain the tubular casing (S), iv-m) stretching the tubular casing (S) obtained in step iii-m) by blowing air into the tube of the tubular casing (S) and by simultaneously guiding the tubular casing (S) over at least one roller, preferably a roller system, to obtain a stretched tubular casing (vS).

The elucidations and preferences described above for steps i) to iii) of the process for producing the tubular casing (S) apply correspondingly to steps i-m) to iii-m) of the multi-blowing process.

Preferably, the tubular film of the at least one copolyamide in molten form is cooled in a water bath in step iii-m).

It may also be preferable to guide the tubular film comprising the at least one copolyamide through a first roller system during the cooling in step iii-m), where the tube is stretched in its length.

In the multi-blowing process, steps iii-m) and iv-m) may be carried out simultaneously or successively; preferably, steps iii-m) and iv-m) are carried out successively. Especially preferably, steps iii-m) and iv-m) are carried out successively and the tubular casing (S) obtained in step iii-m) is heated before step iv-m). It is preferable here that the tubular casing (S) is heated before step iv-m) to a temperature above the at least one glass transition temperature ($T_{G(C)}$) of the at least one copolyamide present in the tubular casing (S) and below the melting temperature ($T_{M(C)}$) of the at least one copolyamide present in the tubular casing (S). The tubular casing (S) is in that case preferably stretched in step iv-m) at the temperature to which it is heated before step iv-m).

It will be apparent that in the casting process, in the blowing process, in the biaxially-oriented polyamide film process, and in the multi-blowing process, step i1), in which at least one further polymer (FP) is provided in molten form in a further extruder, can optionally also be carried out and that in that case, in accordance with step ii) of the process for producing the tubular casing (S), a film of the at least one copolyamide and the at least one further polymer (FP), each in molten form, is obtained in step ii-c), in step ii-b), in step ii-o), and in step ii-m) and, in accordance with step iii) of the process for producing the tubular casing (S), this is cooled in step iii-c), in step iii-b), in step iii-o), and in step iii-m).

The elucidations and preferences described above for the optionally performed step i1) of the process for producing the tubular casing (S) apply correspondingly to the optionally performed step i1).

Preferably, no step i1) is carried out in the biaxially-oriented polyamide film process. Thus, preferably no further polymer (FP) is provided in a further extruder in the biaxially-oriented polyamide film process.

After it has been produced, the stretched tubular casing (P) obtained can for example be wound up. Processes for this purpose are known to those skilled in the art.

Use of the Tubular Casing (S) for Food

The tubular casing for food according to the invention can be used in all fields known to those skilled in the art. The tubular casing according to the invention is in particular used as a sausage casing for the production of smoked or dry/semi-dry sausage products.

The present invention therefore also provides for the use of the tubular casing (S) according to the invention as a sausage casing.

The present invention is more particularly elucidated hereinbelow with reference to examples.

EXAMPLES

Molecular weight was determined by gel permeation chromatography against a poly(methyl methacrylate) standard from Polymer Standard Services GmbH®, headquartered in Mainz. The solvent was hexafluoro-2-propanol and the concentration of the polymer on injection onto a styrene-divinylbenzene column was 1.5 mg/ml. The number of theoretical plates was 20 000.

Viscosity numbers of polyamides not comprising any 1,5-diamino-3-oxapentane units were determined in a 0.5% by weight solution in 96% by weight sulfuric acid at 25° C. in accordance with EN ISO 307:2007+Amd 1:2013.

Viscosity numbers of copolyamides comprising 1,5-diamino-3-oxapentane were determined in a 0.5% by weight solution of phenol/o-dichlorobenzene in a weight ratio of 1:1 at 25° C. in an analogous manner to the method described in EN ISO 307:2007+Amd 1:2013.

Glass transition temperatures and melting temperatures were determined in accordance with ISO 11357-1:2009, ISO 11357-2:2013 and ISO 11357-3:2011. For this purpose, two heating runs were carried out and the glass transition and melting temperatures were determined on the basis of the second heating run.

In order to determine the proportion of adipic acid and 1,5-diamino-3-oxapentane in the copolyamide, the copolyamide was hydrolyzed in dilute hydrochloric acid (20%). This protonated the units derived from 1,5-diamino-3-oxapentane, with the chloride ions from the hydrochloric acid forming the counterion. An ion exchanger was then used to exchange this chloride ion for a hydroxide ion with liberation of 1,5-diamino-3-oxapentane. Titration with 0.1 molar hydrochloric acid was then used to determine the concentration of 1,5-diamino-3-oxapentane, from which the proportion of adipic acid and 1,5-diamino-3-oxapentane in the copolyamide was calculated.

Density was determined in accordance with DIN EN ISO 1183-3 at a temperature of 25° C.

The statistical distribution of the individual monomers in the copolyamides was determined by $^{13}$C NMR. To this end, a sample was dissolved in deuterated hexafluoro-2-propanol and the following carbonyl carbon signals were assigned via 2D NMR: a.) a shift of 183.6 for a caprolactam carbonyl carbon atom adjacent to a 1,5-diamino-3-oxapentane, b.) 182.9 for an adipic acid carbonyl carbon atom adjacent to a 1,5-diamino-3-oxapentane, c.) 181.7 for a caprolactam carbonyl carbon atom adjacent to a caprolactam, and d.) 181.0 for an adipic acid carbonyl carbon atom adjacent to a caprolactam. The $^{13}$C NMR signals were measured using an AV 399 instrument from Bruker®.

Water vapor permeability and water vapor transmission were determined in accordance with ASTM F 1249 on a Permatran-W® Model 3/33 instrument from MOCON® at 23° C. and 85% relative humidity in duplicate measurements.

The Elmendorf tear propagation resistance was determined in accordance with DIN ISO 6383-2:2004 in the extrusion direction (MD) and at right angles thereto (TD).

Prior to measurement, the films were conditioned according to the standard climate for non-tropical countries, described in DIN EN ISO 291:2008. An 8N pendulum weight was used in a Lorentzen & Wettre® Tearing Tester.

Puncture resistance was determined in accordance with DIN EN 14477 using a metal spike with a diameter of 0.8 mm and a speed of 100 mm/min. The films were conditioned prior to measurement according to the standard climate for non-tropical countries, as described in DIN EN ISO 291: 2008.

Oxygen transmission and oxygen permeability were determined in accordance with ASTM F 1927 on an OX-TRAN® instrument at 23° C. at 0% relative humidity in duplicate measurements.

Water permeability was measured using tubes with a length of 12 cm and a width of 6 cm (see FIG. 1, this shows the experimental setup to determine water permeability). These were produced on a Weber blown film system having a nozzle diameter of 50 mm and an extruder length of 25 cm. The thickness of a single tube side was first determined, then one open side of the tube was heat-sealed at 155° C., the tube was filled with 100 $cm^2$ of distilled water and finally the other side of the tube was also heat-sealed at 155° C. The water-filled, completely closed pouches were attached at both ends to an aluminum dish in order to avoid breakages at the heat-sealed joints (see FIG. 1) and in order to determine their starting weight. The loss in weight at 23° C. and 50% relative humidity was recorded every 24 hours for the first 3 days and then after 7 and 8 days by subtracting the current weight from the original weight.

The following polymers were used:

Polyamides

A-1 Polyamide 6 from BASF SE® sold under the Ultramid® B40L brand name, having a viscosity number of 250 ml/g, a glass transition temperature of 57° C., a melting temperature of 220° C. and a density of 1.15 g/ml.

Copolyamides with 1,5-diamino-3-oxapentane:

C-1 A copolyamide of caprolactam, adipic acid and 1,5-diamino-3-oxapentane was produced by the following method:

3230 g of caprolactam (component (A)), 237 g of 1,5-diamino-3-oxapentane (component (B2)), 333 g of adipic acid (component (B1)) and 190 g of water were mixed in a 7.8 l steel reactor and then purged with nitrogen 10 times. The vessel was then closed and heated to an external temperature of 260° C. within 40 min. At this point, the internal pressure was 7 bar and the internal temperature was 208° C. The steel reactor was stirred under pressure for 50 min, then decompressed and stirred for a further 2 h and 45 min. The internal temperature rose to 237° C. during this time. The vessel was then charged with 15 bar of $N_2$, a valve was opened and the melt strand that formed was pelletized in a water bath. The resulting pellets were extracted with boiling water under reflux for 16 h and then dried under reduced pressure at 70° C. An $M_W$ of 59 600 and an Mn of 24 000 were measured.

The pellets were then condensed at 170° C. in a nitrogen stream for a further 10 hours. The copolyamide obtained had a viscosity number of 238 ml/g, a glass transition temperature of 47° C. and a melting temperature of 198° C. The proportion of 1,5-diamino-3-oxapentane.6 in the copolyamide, based on the total weight of the copolyamide, was 15.5% by weight; the density was 1.149 g/ml.

C-2 A copolyamide of caprolactam, adipic acid and 1,5-diamino-3-oxapentane was produced by the following method:

3040 g of caprolactam (component (A)), 316 g of 1,5-diamino-3-oxapentane (component (B2)), 444 g of adipic acid (component (B1)) and 190 g of water were mixed in a 7.8 l steel reactor and purged with nitrogen 10 times. The vessel was then closed and heated to an external temperature of 260° C. within 45 min. At this point, the internal pressure was 7 bar and the internal temperature was 207° C. The steel reactor was stirred under pressure for 40 min, then decompressed and stirred for a further 2 h and 30 min. The internal temperature rose to 235° C. during this time. The vessel was then charged with 15 bar of $N_2$, a valve was opened and the melt strand that formed was pelletized in a water bath. The resulting pellets were extracted with boiling water under reflux for 16 h and then dried under reduced pressure at 70° C. An $M_W$ of 61 900 and an Mn of 25 600 were measured.

The pellets were then condensed at 170° C. in a nitrogen stream for a further 10 hours. The copolyamide obtained had a viscosity number of 235 ml/g, a glass transition temperature of 45° C. and a melting temperature of 192° C. The proportion of 1,5-diamino-3-oxapentane.6 in the copolyamide, based on the total weight of the copolyamide, was 20.3% by weight; the density was 1.142 g/ml.

In the $^{13}C$ NMR spectrum, signals a.) had a relative integral of 14.7%, b.) of 4.7%, c.) of 63.9% and d.) of 16.8%.

C-3 A copolyamide of caprolactam, adipic acid and 1,5-diamino-3-oxapentane was produced by the following method:

2850 g of caprolactam (component (A)), 395 g of 1,5-diamino-3-oxapentane (component (B2)), 555 g of adipic acid (component (B1)) and 190 g of water were mixed in a 7.8 l steel reactor and purged with nitrogen 10 times. The vessel was then closed and heated to an external temperature of 260° C. within 50 min. At this point, the internal pressure was 8 bar and the internal temperature was 205° C. The steel reactor was stirred under pressure for 35 min, then decompressed and stirred for a further 2 h and 15 min. The internal temperature rose to 235° C. during this time. The vessel was then charged with 15 bar of $N_2$, a valve was opened and the melt strand that formed was pelletized in a water bath. The resulting pellets were extracted with boiling water under reflux for 16 h and then dried under reduced pressure at 70° C. An $M_W$ of 58 400 and an Mn of 25 400 were measured.

The pellets were then condensed further at 170° C. in a nitrogen stream for 13 hours. The copolyamide obtained had a viscosity number of 237 ml/g, a glass transition temperature of 44° C. and a melting temperature of 186° C. The proportion of 1,5-diamino-3-oxapentane.6 in the copolyamide, based on the total weight of the copolyamide, was 25.3% by weight; the density was 1.152 g/ml.

In the $^{13}C$ NMR spectrum, signals a.) had a relative integral of 19.3%, b.) of 9.2%, c.) of 53.8% and d.) of 17.8%.

C-4 A copolyamide of caprolactam, adipic acid and 1,5-diamino-3-oxapentane was produced by the following method:

2660 g of caprolactam (component (A)), 474 g of 1,5-diamino-3-oxapentane (component (B2)), 665 g of adipic acid (component (B1)) and 190 g of water were mixed in a 7.8 l steel reactor and purged with nitrogen 10 times. The vessel was then closed and heated to an external temperature of 260° C. within 15 min. At this point, the internal pressure was 1 bar and the internal temperature was 110° C. The steel reactor was stirred under pressure for 90 min, then decompressed and stirred for a further 3 h and 20 min. The internal temperature rose to 237° C. during this time. The vessel was then charged with 15 bar of $N_2$, a valve was opened and the melt strand that formed was pelletized in a water bath. The resulting pellets were extracted with boiling water under reflux for 16 h and then dried under reduced pressure at 70° C. An $M_W$ of 60 600 and an Mn of 23 300 were measured.

The pellets were then condensed further at 170° C. in a nitrogen stream for 13 hours. The copolyamide obtained had a viscosity number of 231 ml/g, a glass transition temperature of 42° C. and a melting temperature of 179° C. The proportion of 1,5-diamino-3-oxapentane.6 in the copolyamide, based on the total weight of the copolyamide, was 30.2% by weight; the density was 1.154 g/ml.

Production of monofilms in the casting process:

The monofilms made from materials A-1, C-1, 0-2, 0-3 and 0-4 were extruded on a Weber cast extrusion system with an extruder screw having a diameter of 30 mm and a throughput of 5 kg/h. The chill roller was cooled to 20° C. The films had a width of 150 mm.

The properties of the extruded films were as follows:

to the invention had released all the water from its interior to the ambient air after 8 days, the pouch made of material A-1 still contained 82% of the water. Both pouches were stored next to one another at a room temperature of 23° C. and 50% relative humidity.

The invention claimed is:

1. A tubular casing (S) for food comprising at least one copolyamide produced by polymerizing the following components:

(A) 60-95% by weight of at least one lactam and (B) 5-40% by weight of a monomer mixture (M) comprising the following components:

(B1) at least one $C_4$-$C_{12}$ dicarboxylic acid and (B2) at least one diamine, where component (B2) comprises 1,5-diamino-3-oxapentane and where the percentages by weight of components (A) and (B) are each based on the sum total of the percentages by weight of components (A) and (B).

2. The tubular casing (S) for food according to claim 1, wherein component (A) is selected from the group consisting of 6-aminohexanolactam and 12-aminododecanolactam.

3. The tubular casing (S) for food according to claim 1, wherein component (A) is 6-aminohexanolactam.

4. The tubular casing (S) for food according to claim 1, wherein component (B) comprises in the range from 45 to 55 mol % of component (B1) and in the range from 45 to 55 mol % of component (B2), in each case based on the total molar amount of component (B).

5. The tubular casing (S) for food according to claim 1, wherein component (B1) is selected from the group consisting of butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, terephthalic acid and isophthalic acid.

6. The tubular casing (S) for food according to claim 1, wherein component (B1) is hexanedioic acid (adipic acid).

7. The tubular casing (S) according to claim 1, wherein the copolyamide has a glass transition temperature (TG(c)), where the glass transition temperature (TG(c)) is in the range from 30° C. to 70° C.

TABLE 1

| Material | | A-1 | C-1 | C-2 | C-3 | C-4 |
|---|---|---|---|---|---|---|
| Film thickness | [μm] | 51.0 | 50.2 | 51.9 | 50.3 | 48.4 |
| Content of 1,5-diamino-3-oxapentane.6 | [%] | 0 | 15.5 | 20.3 | 25.3 | 30.2 |
| Water vapor transmission | [g/m$^2$*d] | 48.0 | 64.8 | 92.2 | 89.5 | 127 |
| Water vapor permeability | [g*μm/m$^2$*d] | 2448 | 3253 | 4785 | 4502 | 6147 |
| Tear propagation resistance (MD) | [mN] | 974 ± 58 | 2845 ± 105 | 3148 ± 148 | 3541 ± 228 | 3435 ± 289 |
| Tear propagation resistance (TD) | [mN] | 939 ± 61 | 3136 ± 234 | 3788 ± 453 | 4465 ± 471 | 4920 ± 529 |
| Puncture resistance | [mJ] | 20.2 | 20.2 | 21.4 | 22.0 | 22.5 |
| Oxygen transmission | [cm$^3$/m$^2$*d*bar] | 25.1 | 27.6 | 21.5 | 22.2 | 18.9 |
| Oxygen permeability | [cm$^3$*μm/m$^2$*d*bar] | 1280 | 1386 | 1116 | 1117 | 1089 |

The above examples show that the copolyamides according to the invention have significantly increased water vapor transmission and tear propagation resistance in films compared to a polyamide 6. The puncture resistance is increased slightly compared to polyamide 6 and the oxygen transmission is even slightly lower for materials C-2, C-3, and C-4.

The copolyamides are therefore very well suited for packagings in which water is intended to migrate out of the packaging.

Figure 2:
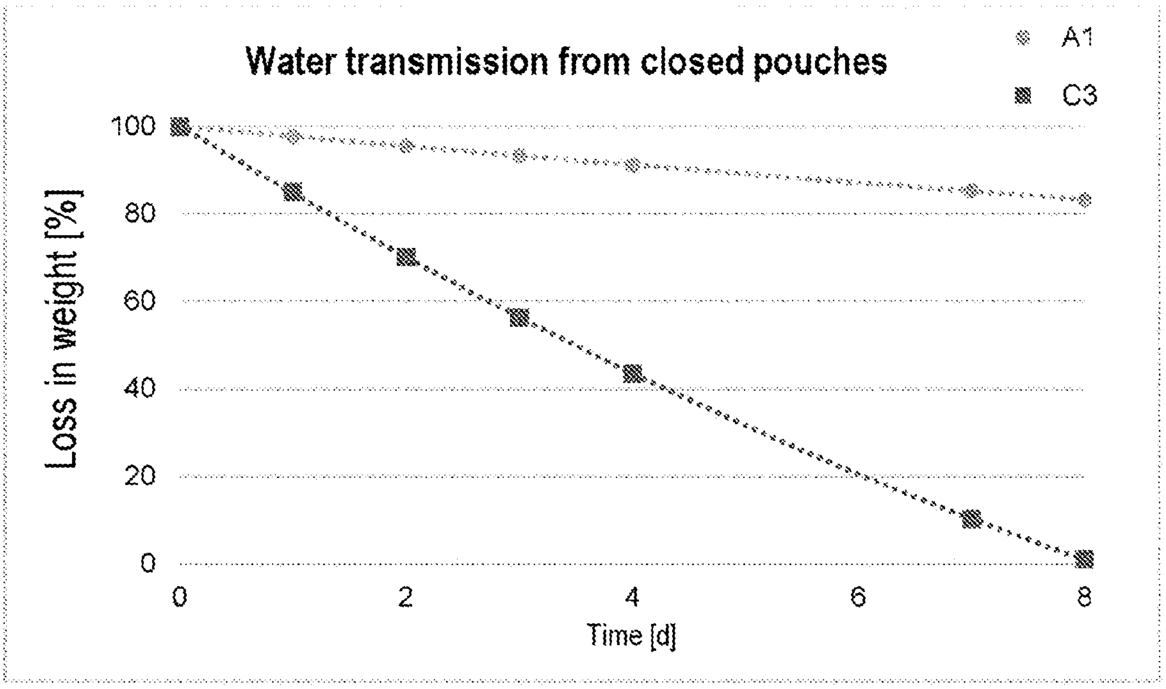
FIG. 2 is a graph showing the water permeability from a sealed pouch made of material A-1.

FIG. 2 shows the water permeability from a sealed pouch made of material A-1 having a film diameter of 26.73 μm, and made of material C-3 having a film diameter of 24.67 μm. Whereas a pouch made of copolyamide C-3 according 8. The tubular casing (S) for food according to claim 1, wherein the tubular casing (S) has a melting temperature (TM(c)), where the melting temperature (TM(c)) is in the range from 100° C. to 210° C.

9. The tubular casing (S) for food according to claim 1, wherein the tubular casing (S) has a thickness in the range from 5 μm to 100 μm.

10. The tubular casing (S) for food according to claim 1, wherein the tubular casing (S) has a water vapor permeability (WVP) in accordance with ASTM F 1249, at 23° C. and 85% RH, of at least 2500 g*μm/($m^2$*d).

11. The tubular casing (S) for food according to claim 1, wherein the tubular casing (S) is produced in a multi-blowing process.

12. A process for producing a tubular casing (S) for food according to claim 1, comprising the following steps:

i) providing at least one copolyamide produced by polymerizing the following components:
(A) 60-95% by weight of at least one lactam and
(B) 5-40% by weight of a monomer mixture (M) comprising the following components:
(B1) at least one $C_4$-$C_{12}$ dicarboxylic acid and
(B2) at least one diamine,
where component (B2) comprises 1,5-diamino-3-oxapentane and where the percentages by weight of components (A) and (B) are each based on the sum total of the percentages by weight of components (A) and (B),
in molten form in an extruder ii) extruding the at least one copolyamide provided in step i) in molten form from the extruder through a ring die to obtain a tubular film of the at least one copolyamide in molten form, iii) cooling the tubular film, of the at least one copolyamide in molten form, obtained in step ii), where the at least one copolyamide solidifies to obtain the tubular casing (S), iv) stretching the tubular casing (S) obtained in step iii) by blowing air into the tube of the tubular casing (S) and by simultaneously guiding the tubular casing (S) over at least one roller to obtain a stretched tubular casing (vS).

13. The process for producing a tubular casing (S) for food according to claim 12, wherein the tubular film comprising the at least one copolyamide is guided through a first roller system during the cooling in step iii), where the tube is stretched in its length.

14. The process for producing a tubular casing (S) for food according to claim 12, wherein steps (iii) and (iv) are carried out successively or simultaneously.

15. The process for producing a tubular casing (S) for food according to claim 12, wherein the tubular casing (S) obtained in step iii) is heated before step iv).

16. The process for producing a tubular casing (S) for food according to claim 15, wherein the tubular casing (S) is heated to a temperature above a glass transition temperature ($T_{G(c)}$) of the at least one copolyamide and below a melting temperature ($T_{M(c)}$) of the at least one copolyamide.

17. A tubular casing (S) for food according to claim 1, which is a packaging casing.

18. A tubular casing (S) for food according to claim 1, which is a sausage casing.

* * * * *